July 7, 1931.　　　A. GAUDENZI　　　1,813,535

PROTECTION OF RECTIFIER SYSTEMS

Filed April 9, 1928

INVENTOR
ARTHUR GAUDENZI

BY Cromwell, Greist & Warden

ATTYS.

Patented July 7, 1931

1,813,535

UNITED STATES PATENT OFFICE

ARTHUR GAUDENZI, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

PROTECTION OF RECTIFIER SYSTEMS

Application filed April 9, 1928, Serial No. 268,573, and in Germany August 8, 1927.

This invention relates to the protection of rectifier systems and it has particular application to mercury arc rectifiers of the polyphase type.

Among the objects of the invention is an improved protective system for such rectifiers utilizing relays or similar means responsive to the current flow conditions in the anode circuits of such rectifiers to cut in a current limiting impedance or resistor into the circuit upon occurrence of abnormal current flow, such as in a case of back-fire, the protective relay means of the rectifier being maintained in energized condition from a source independent of the rectifier, for instance, by being supplied from another parallel connected direct-current machine or rectifier.

Figure 1:
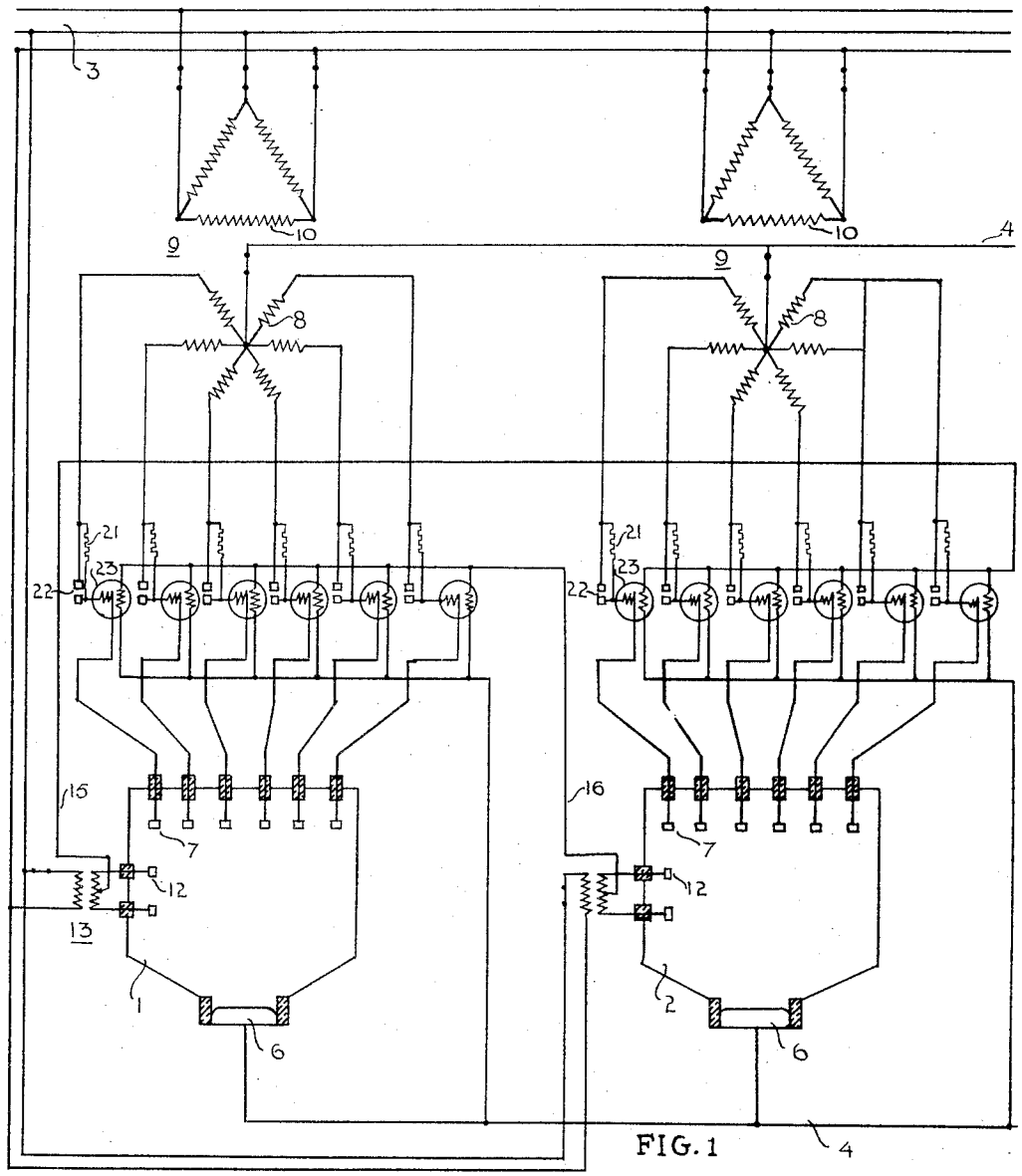
Figure 2:
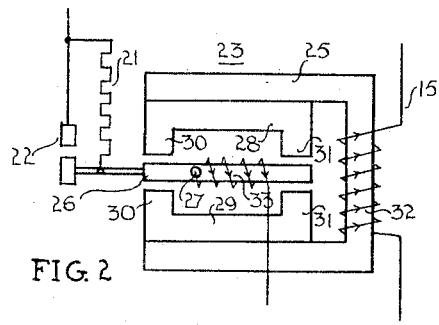

The foregoing and other objects of the invention will be best understood by reference to the accompanying drawings, wherein Fig. 1 is a diagrammatic view of a rectifier system embodying one form of the invention; and Fig. 2 is a detailed diagrammatic view of the relay of the rectifier system in Fig. 1.

In a previously filed application, I have described and claimed a system for protecting rectifiers, more particularly for suppressing back-fires or arcing in mercury vapor rectifiers, by inserting resistors or similar impedance elements in the anode circuits, the resistors being automatically placed in the circuit by quick-acting reverse current relays, or similar devices, responsive to back-fire conditions. Where several rectifiers are operated in parallel either among themselves or with other direct-current machines or apparatus, and the reverse current relays associated with the rectifiers are energized from the rectifier that they are intended to protect, it may happend that under back-fire conditions this energizing current will drop to zero. Under such circumstances, the reverse current relay protecting the anode which has back-fired will not be energized and consequently will not operate.

According to the present invention this drawback is overcome by providing the energizing current for the reverse current relay of a rectifier that is to be protected from machines independent from this rectifier, preferably from direct-current machines or apparatus operating in parallel with said rectifier. Such apparatus may be another rectifier, a motor, generator, battery, or, in general, some source of energy that is not directly affected by the back-fire in the rectifier that is to be protected.

An exemplification of my invention is shown in the accompanying drawings illustrating a system including two six-phase rectifiers 1, 2 for converting alternating current derived from a three-phase line 3 into direct-current supplied to a direct-current line 4. Each rectifier has a mercury cathode 6 connected to one main of the direct-current line and six main anodes 7 arranged to be supplied from a six-phase secondary winding 8 of a supply transformer 9 having its primary winding 10 connected to the three-phase line. Each rectifier is also provided with a pair of auxiliary exciting anodes 12 arranged to be supplied from auxiliary transformers 13 supplied from one phase of the three-phase line 3, each auxiliary transformer having a secondary winding connected to the exciting anodes, the mid point of the secondary winding being connected to direct-current mains leading from the mercury cathodes by means of leads 15, 16 in the manner more fully described hereinafter.

The polyphase secondary main transformer supply windings 8 are of the star-connected type and included in the connection of each transformer phase to its associated anode is a current limiting impedance such as a resistor 21 adapted to be short circuited by means of a pair of switch contacts 22 so arranged that when closed the respective resistor is short circuited and the transformer phase is directly connected to the associated rectifier anode 7. The closure and opening of the switch contacts 22 is controlled by a suitable relay means, in the present instance by a reverse-current relay responsive to reverse-current flow to the associated anode 7 of the rectifier.

As shown in detail in Fig. 2, the relay 23 comprises a field member 25 and an armature 26 so arranged and connected that under normal current flow conditions in the rectifier and in the circuit the armature 26 will be held in a position at which the switch contacts 22 are closed, short circuiting the resistance 21 in the anode leads. To this end the armature shown in the form of an elongated bar of magnetic material is pivoted at 27. Cooperating with the armature 26, and disposed on opposite sides thereof, are pole members 28, 29 extending from the field member 25, each pole member having two pole projections 30, 31 acting on the two end portions of the armature 26. The field member 25 carries an exciting winding 32 which imparts to the field structure polar characteristics. The armature 26 likewise carries an exciting winding 33 and by suitably varying the current flowing through said armature exciting winding it may be caused to move around its pivot 27 in clockwise direction so as to close the switch contacts 22 or in counter-clockwise direction to open the switch contacts 22.

The relay is so connected that under normal current flow conditions when the rectifier is operating satisfactorily, the current in the field and armature windings will flow in the direction indicated by the arrows in Fig. 2 holding the armature 26 in a position where the switch contacts 22 are closed. In case of back-fire and reversal of current flow in the anode circuit, the current flow direction in the armature exciting winding 33 will be reversed. This causes counter-clockwise rotation of the armature immediately opening the contacts 22 and cutting in the current limiting or stabilizing resistor 21 into the circuit of the anode which was under back-fire.

As explained hereinabove, and shown in Fig. 1, the energizing current for the field members of the protective relays of one rectifier are arranged to be energized from a source of supply independent of the rectifier which is to be protected by said relays. In the form of the invention shown in the drawings, I utilize the direct-current exciting circuit for the right-hand rectifier 2 for supplying energizing current to the field exciting windings 32 of the anode relays of the left-hand rectifier 1. Likewise, the field exciting windings 32 of the protective relays of the right-hand rectifier 2 are supplied with direct current from the exciting circuit of the left-hand rectifier 1. To this end all the relay field exciting coils 32 of the rectifier 1 are connected in parallel in the lead 16 from the mid point of the auxiliary transformer 13 of the rectifier 2, and the field coils of the relays of the rectifier 2 are connected in the lead 15 of the secondary transformer winding 13 of the rectifier 1. Suitable provisions are, of course, made for proper distribution of the current to the individual relays. If desired, the field circuits of the individual relays may be connected in series instead of in parallel.

In the foregoing arrangement the operation of the rectifier will be properly safeguarded under all circumstances since the protective relays of each rectifier are maintained in energized condition from a source of current independent of the rectifier that is to be protected. Accordingly, in case of a back-fire condition or similar trouble in the rectifier, which causes a reversal of the current in the anode leads, the reverse-current flow through the relay associated with the back-firing anode will, under all circumstances, be caused to open the associated switch contacts 22 inserting the current limiting impedance 21 in the associated anode circuit, suppressing the back-fire and restoring normal operating conditions in the rectifier.

The invention is not limited to the particular form of construction or method of operation or system of connection described hereinabove, but is susceptible of many other modifications that will suggest themselves to those skilled in the art. It is, accordingly, desired that the appended claims be given a broad construction commensurate with the scope of the invention.

I claim:

1. In a rectifier system, a rectifier having an anode and a cathode, a circuit leading from said anode and cathode, relay means connected to be actuated by abnormal current flow conditions in said circuit, operation of said relay means requiring maintaining the same in energized condition, an independent direct-current supply device connected in parallel to said rectifier, and means for deriving from said independent supply device current for energizing said relay means.

2. The combination of a rectifier of the vapor type including a cathode and a plurality of anodes cooperating with said cathode, a transformer having a plurality of leads connected to said anodes, relay means associated with said anode leads and responsive to abnormal current flow therein for stabilizing the operation of said rectifier, actuation of said relay means requiring maintaining the same in energized condition, and a source of supply independent of said rectifier for energizing said relay means.

3. The combination of a rectifier apparatus having a plurality of anodes of like polarity, a transformer having leads connected to said electrodes, relay means associated with said leads and responsive to abnormal current flow therein for stabilizing said rectifier, the actuation of said relay means requiring maintaining the same in energized condition, and a source of direct current operating independently in parallel with said rectifier for maintaining said relay in energized condition.

4. The combination of a rectifier apparatus having a plurality of anodes of like polarity, a transformer having leads connected to said electrodes, relay means associated with said leads and responsive to reverse current flow therein for stabilizing said rectifier, the actuation of said relay means requiring maintaining the same in energized condition, and a source of direct current operating independently in parallel with said rectifier for maintaining said relay in energized condition.

5. The combination of a mercury arc rectifier having a cathode and a plurality of anodes, a transformer having a plurality of leads, reverse current relays associated with said leads, said reverse current relays having a pair of cooperating actuating coils, one of said coils being responsive to the current flow in the associated leads, and a source of current independent of said rectifier for supplying the other of said coils.

6. The combination of a mercury arc rectifier having a cathode and a plurality of anodes, a transformer winding having a plurality of leads connected to said anodes, impedance elements connected in said leads, reverse current relay means associated with said leads and arranged to cut in and cut out the impedance element from the associated leads, and a source of supply independent of said rectifier for maintaining said relay means in energized condition.

7. The combination of a mercury arc rectifier having a cathode and a plurality of anodes, a transformer winding having a plurality of leads connected to said anodes, impedance elements connected in said leads, reverse current relay means associated with said leads and arranged to cut in and cut out the impedance element from the associated leads, said relay means having a pair of cooperating actuating coils, one of said coils being energized by the current flow in the associated leads, and a source of direct current independent of said rectifier for supplying the other of said coils.

8. The combination of a mercury arc rectifier having a cathode and a plurality of anodes, a transformer winding having a plurality of leads connected to said anodes, impedance elements connected in said leads, reverse current relay means associated with said leads and arranged to cut in and cut out the resistor from the associated leads, said relay means having a pair of cooperating actuating coils, one of said coils being energized by the current flow in the associated leads, and an independently operating rectifier supplying the other of said coils.

9. The combination of a pair of parallel operated direct-current generating apparatus, one of said apparatus being a rectifier having a cathode, a plurality of anodes, and a transformer having leads connected to said anodes for supplying the same, relay means in each of said leads, resistors associated with each of said leads, said relays being arranged to cut out the resistor from the associated leads under normal current flow conditions and cut in said resistor under abnormal current flow conditions, each relay having a pair of cooperating windings, one of said windings being energized by the current flowing in the associated anode lead, the other of said windings being energized with direct current from the direct-current generating apparatus operating in parallel with said rectifier.

10. The combination with a plurality of parallel operating mercury vapor rectifiers, each rectifier comprising a cathode, a plurality of cooperating anodes, a transformer having leads connected to said anodes, and a direct-current exciting circuit for maintaining said cathode in exciting condition, of a protective system for said rectifiers including relays associated with each of said leads, resistors arranged to be connected and cut out by said relays depending on the conditions of current flow in the associated leads, each of said relays having a pair of cooperating actuating coils, one of said coils being energized by the current flowing in the associated anode lead, and the other of said coils being energized by the current in the exciting circuit of the rectifier operating in parallel with the rectifier associated with said relay.

In testimony whereof I have hereunto subscribed my name this 9th day of March, A. D. 1928, at Zurich, Switzerland.

ARTHUR GAUDENZI.